US007333318B2

(12) United States Patent
Hidaka et al.

(10) Patent No.: US 7,333,318 B2
(45) Date of Patent: Feb. 19, 2008

(54) MULTILAYER CAPACITOR AND MOLD CAPACITOR

(75) Inventors: Akio Hidaka, Miyazaki (JP); Yuuichi Murano, Miyazaki (JP); Shinichi Wakasugi, Miyazaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/518,220

(22) Filed: Sep. 11, 2006

(65) Prior Publication Data

US 2007/0058326 A1    Mar. 15, 2007

(30) Foreign Application Priority Data

Sep. 13, 2005   (JP)   ............... 2005-264966

(51) Int. Cl.
H01G 4/06 (2006.01)

(52) U.S. Cl. ............... 361/321.1; 361/321.2; 361/311; 361/313; 361/306.1; 361/306.3

(58) Field of Classification Search ........ 361/311–313, 361/321.1, 321.2, 321.4, 306.1, 306.3, 302–305
See application file for complete search history.

(56) References Cited

U.S. PATENT DOCUMENTS

| 5,471,364 | A  | * | 11/1995 | Summerfelt et al. ..... 361/321.4 |
| 5,590,016 | A  | * | 12/1996 | Fujishiro et al. ............ 361/313 |
| 5,880,925 | A  | * | 3/1999  | DuPre et al. ................ 361/303 |
| 6,144,546 | A  | * | 11/2000 | Mizushima et al. ........ 361/303 |
| 6,191,933 | B1 | * | 2/2001  | Ishigaki et al. ............. 361/309 |
| 6,418,009 | B1 | * | 7/2002  | Brunette .................. 361/306.3 |
| 6,507,498 | B1 | * | 1/2003  | Klee et al. .................. 361/793 |
| 6,570,753 | B2 | * | 5/2003  | Bensaoula et al. .......... 361/311 |
| 6,707,685 | B2 | * | 3/2004  | Kabumoto et al. ......... 361/794 |

FOREIGN PATENT DOCUMENTS

JP      2001284157      10/2001

* cited by examiner

Primary Examiner—Nguyen T. Ha
(74) Attorney, Agent, or Firm—Stevens, Davis, Miller & Mosher, LLP

(57) ABSTRACT

A multilayer capacitor 1 has a laminated body 20 configured by laminating a plurality of dielectric substrates 2 each having a plurality of internal electrodes 3 and 5 formed on its main surface and a capacitance component is generated between the facing internal electrodes 3 and 5. The dielectric constant of the dielectric substrate located at a central portion of a lamination direction of the laminated body 20 is lower than that of the dielectric substrate 2 located at the edge of the lamination direction.

12 Claims, 7 Drawing Sheets (a)

(b)

(a)

(b)

(a)

(b)

(a)

(b)

(a)

(b)

FIG. 7 (a) RELATED ART
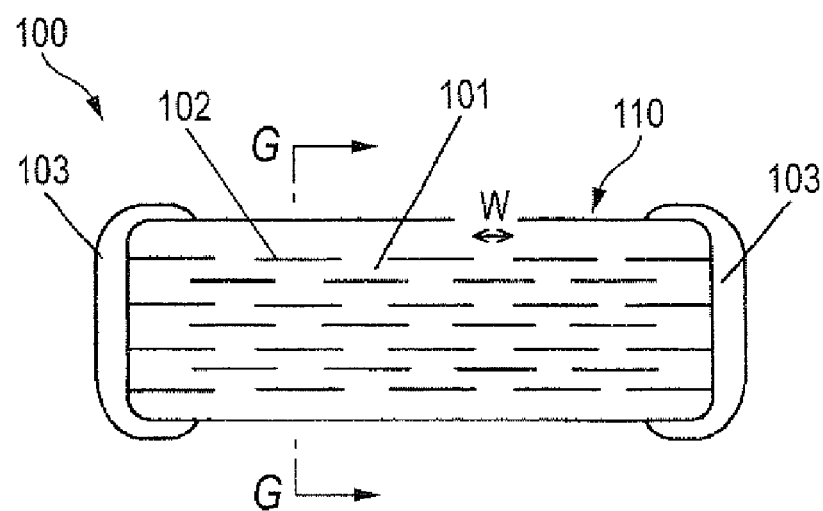
FIG. 7 (b) RELATED ART
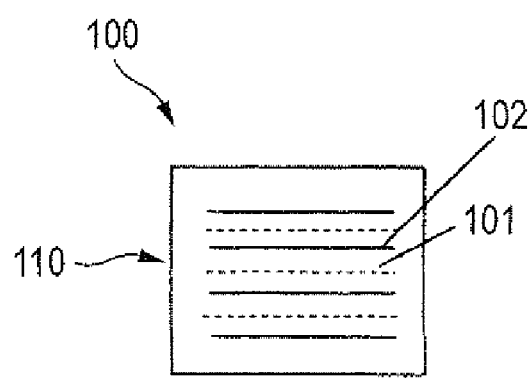

MULTILAYER CAPACITOR AND MOLD CAPACITOR

BACKGROUND

TECHNICAL FIELD

The present invention relates to a multilayer capacitor in which a plurality of dielectric substrates each having internal electrodes formed on its main surface are laminated and a capacitance component is generated between facing internal electrodes, and a mold capacitor having the multilayer capacitor formed therein.

In electronic apparatuses such as power supply circuits or modems, a capacitor as well as a plurality of electronic parts may be used in removing noise or cutting a DC component. In accordance with rapid globalization, the electronic apparatuses increasingly require miniaturization and low cost and thus the electronic parts increasingly require miniaturization and low cost. In order to reduce a mounting area or mounting cost upon automatically mounting, a surface-mounting electronic part may be required. Meanwhile, in accordance with the miniaturization, conflicting requirements such as high performance, the reduction of characteristic variation and the improvement of durability are increasingly needed. Particularly, the electronic parts have been increasingly used in a power supply circuit or the removal of noise in plasma displays or large-sized displays and the high capacitance and high breakdown voltage of the capacitor are required.

FIG. 7(a) is a side cross-sectional view of a conventional multilayer capacitor disclosed in Japanese Unexamined Patent Publication No. 2001-284157. FIG. 7(b) is a cross-sectional view taken along line G-G of the multilayer capacitor shown in FIG. 7(a). The multilayer capacitor 100 includes a laminated body 110 configured by laminating a plurality of dielectric substrates 101. A plurality of internal electrodes 102 are formed on main surfaces of the dielectric substrates of the laminated body 110, respectively. The laminated body 110 has a substantially rectangular parallelepiped shape and has a pair of external electrodes 103 formed on the both side surfaces which face each other in a longitudinal direction.

The multilayer capacitor 100 is formed by laminating the plurality of dielectric substrates 101 and the internal electrodes 102 are formed on the dielectric substrates 101 by screen printing, transferring printing or paste coating. That is, the dielectric substrates 101 on which the internal electrodes 102 are formed are laminated to form the laminated body 110.

In such a multilayer capacitor 100, capacitance components are generated between the internal electrodes 102 formed on different dielectric substrates 101, that is, in an interlayer between the internal electrodes 102 and the capacitance components are added to increase the capacitance.

When a voltage is applied to the multilayer capacitor 100 having the above-described structure, voltage stress is caused in a predetermined portion. The voltage stress is largest in the periphery of a central portion of the multilayer capacitor 100.

Accordingly, the periphery of the central portion of the laminated body 110 is most influenced by the voltage stress. In order to improve a breakdown voltage of the multilayer capacitor 100, the breakdown voltage of the periphery of the central portion of the multilayer capacitor need be improved. In the improvement of the breakdown voltage, weakest voltage stress is caused by the voltage of a adjacent portion between the internal electrodes 102 formed on the main body of the same dielectric substrate 101 and weaker voltage stress is caused by the voltage generated between the adjacent internal electrodes 102 formed on the dielectric substrates 101 which overlap each other in a lamination direction.

However, in the conventional multilayer capacitor 100, the internal electrodes 102 are formed on the main surfaces of the dielectric substrates 101 at a distance W at regular intervals. Accordingly, the distances W between the adjacent internal electrodes 102 formed on the same dielectric substrate 101 is the same at even any position of the multilayer capacitor 100. Since the laminated dielectric substrates 101 have the same thickness, the intervals between the internal electrodes 102 which are formed between the different dielectric substrates 101 and are adjacent to each other in the lamination direction are also the same in the lamination direction.

When a predetermined voltage is applied to the multilayer capacitor 100, a difference between the breakdown voltage of the periphery of the central portion of the multilayer capacitor 100 having the weakest voltage stress and the breakdown voltage of the other portion is caused. That is, the breakdown voltage of the periphery of the central portion having the weakest breakdown voltage becomes the breakdown voltage of the multilayer capacitor 100. Conventionally, the countermeasure to the high breakdown voltage is insufficient.

In order to solve the above-described problem, the area of the main surface of the dielectric substrate 101 and the thickness of the dielectric substrate can increase to improve the breakdown voltage. However, in this case, the whole size of the multilayer capacitor 100 increases. This opposes the miniaturization of the device, which is recently required. Accordingly, a multilayer capacitor which increases capacitance and improves a breakdown voltage without increasing the shape must be developed.

SUMMARY

The present invention is made to solve the above-described problems and it is an object of the present invention to provide a multilayer capacitor capable of obtaining a high breakdown voltage without impeding miniaturization and high capacitance and a mold capacitor including the multilayer capacitor mounted therein.

The present invention has been made in view of the circumstances and provides a capacitor including a first dielectric having a first dielectric constant, a second dielectric having a second dielectric constant and a third dielectric which is disposed between the first dielectric and the second dielectric and has a third dielectric constant lower than the first and second dielectric constants.

It is possible to reduce a voltage applied to the dielectric by decreasing the dielectric constant of the dielectric. Accordingly, as the dielectric constant decreases, the breakdown voltage of the dielectric is improved. With respect to strong voltage stress in the periphery of the central portion of the capacitor which was problematic conventionally, it is possible to improve the breakdown voltage of the capacitor by decreasing the dielectric constant of the dielectric located at the central portion.

BRIEF DESCRIPTION OF THE DRAWINGS

FIG. 7(a) is a side cross-sectional view of a conventional multilayer capacitor and FIG. 7(b) is a cross-sectional view taken along line G-G of the multilayer capacitor shown in FIG. 7(a).

DETAILED DESCRIPTION

Figure 1A:
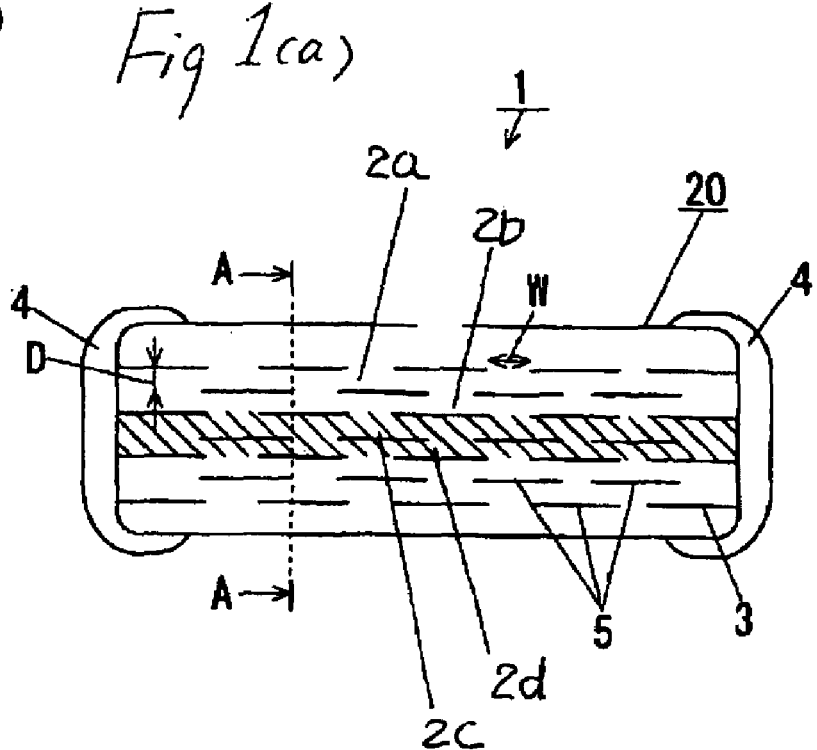
FIG. 1(a) is a side cross-sectional view of a multilayer capacitor according to an embodiment of the present invention.
Figure 1B:
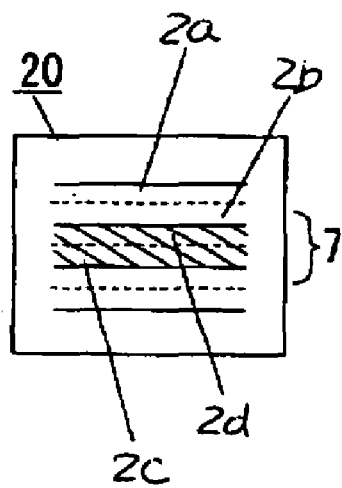
FIG. 1(b) is a cross-sectional view taken along line A-A of the multilayer capacitor shown in FIG. 1(a)

As shown in FIGS. 1(a) and 1(b), a multilayer capacitor 1 includes a laminated body 20 configured by laminating a plurality (four) of dielectric substrates 2 (a dielectric substrate 2a, a dielectric substrate 2b, a dielectric substrate 2c and a dielectric substrate 2d) each having a rectangular flat-plate shape. On a main surface of each of the dielectric substrates 2, a plurality of internal electrodes 3 and 5 are formed at a predetermined interval.

Figure 2A:
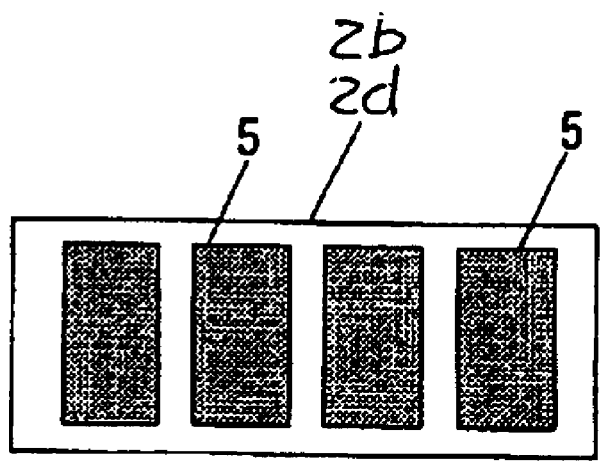
FIG. 2(a) is a view showing the shape of internal electrodes formed on dielectric substrates 2b and 2d.
Figure 2B:
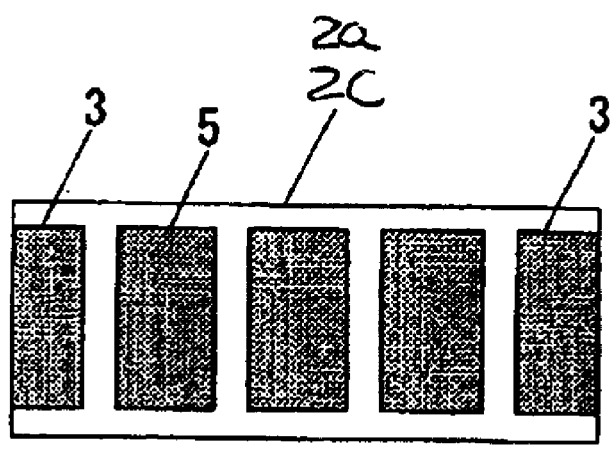
FIG. 2(b) is a view showing the shape of internal electrodes formed on dielectric substrates 2a and 2c.

As shown in FIGS. 2(a) and 2(b), the internal electrodes include extraction electrodes 3 which extend from a predetermined position of the substrate to an edge of the substrate and floating electrodes 5 which are insulated from the periphery and are not connected to any connector. The dielectric substrates 2 are divided into four kinds of dielectric substrates by a difference between the patterns of the extraction electrode 3 and the floating electrode 5 and a difference between dielectric constants. That is, four floating electrodes 5 are formed on the main surfaces of the dielectric substrates 2b and 2d shown in FIG. 2(a). Two extraction electrodes 3 and three floating electrodes 5 are formed on the main surfaces of the dielectric substrates 2a and 2c shown in FIG. 2(b). The dielectric constant of the dielectric substrates 2c and 2d is lower than that of the dielectric substrates 2a and 2b.

In the laminated body 20, the dielectric substrate 2c and the dielectric substrate 2d having the low dielectric constant are laminated in the central portion 7 of the lamination direction (a portion having the low dielectric constant is shown by oblique lines in FIGS. 1(a) and 1(b)). Meanwhile, the dielectric substrate 2a and the dielectric substrate 2b having the high dielectric constant are alternately laminated in the edges (upper and lower edges of FIGS. 1(a) and 1(b)) of the lamination direction. That is, in the laminated body 20 according to the present embodiment, the dielectric constant of the central portion 7 of the lamination direction of the dielectric substrates 2 is low and the dielectric constant of the edge of the lamination direction thereof is high.

Meanwhile, although the dielectric constants of the upper edge and the lower edge are identical to each other in the laminated body 20 shown in FIG. 1, the dielectric constants of the upper edge and the lower edge of the laminated body may be different from each other.

Material and Fabrication of Dielectric Base Body

The material of a dielectric substrate 2a and a dielectric substrate 2b disposed on the edge of the laminated body 20 is a mixture obtained by mixing 2.0-mol % particles of a solid solution of $SiO_2$-CaO—BaO in particulates obtained by adding particles of $MNO_2$, particles of $Dy_2O_5$ and particles of MgO to particles of $BaTiO_3$. The dielectric constant of the dielectric substrate 2a and the dielectric substrate 2b is 2200 µF to 2400 µF.

Next, a method of preparing the dielectric substrate 2a and the dielectric substrate 2b will be described. The mixture is temporarily heated at 1000 ° C. and then granulated by a medium stirring mill such that a particle diameter is 1 µm or less. The granulated mixture is mixed with a resin (for example, butyral resin), a solvent, a plasticizer and a dispersant to form a slurry having viscosity of 10 to 20 dpa·s. This slurry is coated on a PET film using a coater to form a ceramic sheet having a thickness of 15 µm to 30 µm. The extraction electrode 3 and the floating electrode 5 are formed by printing a Ni paste on the ceramic sheet.

The material of the dielectric substrate 2c and the dielectric substrate 2d disposed in the central portion 7 of the laminated body 20 is a mixture obtained by mixing 1.5-mol % particles of a solid solution of $SiO_2$-CaO—BaO in a mixture obtained by adding particles of $MNO_2$, particles of $Dy_2O_5$ and particles of MgO to particles of $BaTiO_3$. The dielectric constant of a third dielectric substrate 2c and a fourth dielectric substrate 2d is 1800 µF to 2000 µF.

A method of preparing the dielectric substrate 2c and the dielectric substrate 2d is similar to the method of preparing the dielectric substrate 2a and the dielectric substrate 2b.

The material of the four dielectric substrates 2 may be a mixture obtained by adding $SrTiO_3$, $CaSnO_3$, $CaTiO_3$, $Nb_2O_5$, $Sb_2O_5$, $Ta_2O_3$ or rare-earth oxide in a solid solution of $BaTiO_3$-$BaZrO_3$, a mixture obtained by mixing a solid solution of $MnO_2$, MgO or $SiO_2$-CaO, $V_2O_5$, CaO or rare-earth oxide in a solid solution of $SrTiO_3$-$CaTiO_3$, or a mixture obtained by adding a solid solution of $Nd_2O_3$-$TiO_2$-BaO or a solid solution of $MgTiO_3$-$CaTiO_3$ in a solid solution of $BaTiO_2$-$ZrO_2$.

The laminated body 20 has the substantially rectangular parallelepiped shape by laminating dielectric substrates 2 having the rectangular flat-plate shape. On two side surfaces of the laminated body, which face each other in a first direction which is a horizontal direction, the pair of external electrodes 4 is wholly covered. The internal electrodes 5 formed on the dielectric substrate 2a and the dielectric substrate 2c are connected to the external electrodes 4 at the edge of the substrate, respectively. Here, a "direction perpendicular to the lamination direction" includes two directions including the longitudinal direction and a horizontal direction when the laminated body 20 has the substantially rectangular parallelepiped shape. When the longitudinal direction as a second direction is expressed, the "longitudinal direction perpendicular to the lamination direction" is used and, when the horizontal direction as the first direction is expressed, the "horizontal direction perpendicular to the lamination direction" is used.

Now, a procedure of preparing the laminated body 20 will be described. As shown in FIG. 1, the laminated body 20 is obtained by arranging the ceramic sheet of the dielectric substrate 2c and the ceramic sheet of the dielectric substrate 2d between a laminated body configured by alternately laminating the ceramic sheet of the dielectric substrate 2a and the ceramic sheet of the dielectric substrate 2b in the central portion 7 and sintering the laminated body at a temperature of 1300° C. for 2 hours in a reduction atmosphere of N2-H2-CO2-based gas.

The multilayer capacitor 1 having the above-described configuration can realize very high capacitance by a total sum of capacitances generated between the internal electrodes 3 and 5. That is, if the same shape, the same size and the same material are used, capacitance higher than that of a single-plate type capacitor can be obtained.

The merit of the multilayer capacitor 1 according to the present embodiment will be described in view of the breakdown voltage. In the multilayer capacitor 1, strongest voltage stress is caused in the periphery of the central portion 7 of the lamination direction and in the periphery of the central portion of the horizontal direction perpendicular to the lamination direction. The breakdown voltages necessary for the central portion 7 and the other portion are different.

In order to improve the breakdown voltage against the voltage stress, there is provided a method of increasing the thickness of the dielectric substrate or dividing the internal electrodes and dividing a voltage across the both ends thereof to improve the breakdown voltage. When the division number of the internal electrodes increases, the division number of the voltage increases and thus the breakdown voltage can be improved.

In the present embodiment, the dielectric constant of the periphery of the central portion 7 of the dielectric substrate 2 is lower than that of the other portion. By previously decreasing the dielectric constant of the periphery of the central portion 7 having the large voltage stress, the voltage stress caused in the dielectric substrates 2 can be reduced. As shown in FIGS. 1(a) and 1(b), this can be accomplished by properly selecting various kinds of dielectric substrates (2a, 2b, 2c and 2d) having different dielectric constants and a method of forming the internal electrodes 3 and 5 and laminating the dielectric substrates 2 having the low dielectric constant in the periphery of the central portion 7.

Instead of the decrease of the dielectric constant in the central portion 7, the dielectric constant may gradually decrease from the edge of the lamination direction to the central portion thereof. In the portion in which the voltage stress is caused, the change gradient of the dielectric constant can be in balance. Thus, the voltage stress can be wholly in balance.

Next, the improvement of the breakdown voltage between the internal electrodes 3 which face each other in the lamination direction will be described. For example, when the thicknesses D (FIG. 1(a)) of the laminated dielectric substrates 2 are different, the dielectric substrates 2 having a large thickness D are disposed in the periphery of the central portion 7 of the lamination direction and the dielectric substrates 2 having a small thickness D are disposed in the periphery of the edge of the lamination direction, the breakdown voltage can be improved.

By such lamination, the breakdown voltage of the internal electrodes 3 and 5, which overlap and face each other, increases in the periphery of the central portion 7 in which the strong voltage stress is caused and thus the breakdown voltage can be wholly in balance. That is, the breakdown voltage between the internal electrodes formed on the different dielectric substrates 2 can be improved. A combination of the configuration of the thicknesses of the dielectric substrates 2 and the configuration of the dielectric constants may be considered and the breakdown voltage can be further improved by the synergistic effect of the combination.

In this example, the dielectric substrates 2 having a large division number and the dielectric substrates 2 having the large thickness D are disposed in the central portion 7. Even when the dielectric substrates 2 having the large division number and the dielectric substrates 2 having the large thickness D may be disposed in a central portion of a lamination direction obtained by further increasing the width from the central portion 7 of the lamination direction in the lamination direction, desired effect can be obtained. To which position the dielectric substrates 2 having the improved breakdown voltages extends from the central portion varies depending on the type, the shape and the size of the multilayer capacitor, the type, the shape and the size of the multilayer capacitor may be properly selected.

The dielectric substrates 2 are made of a dielectric material such as titanium dioxide, a solid solution of calcium titanate and strontium titanate or barium titanate is preferably used. Alternatively, a low dielectric constant material such as alumina may be used. A material such as an oxide-based dielectric material, a metal-based dielectric material or a ceramic-based dielectric material or a composition thereof is properly selected depending on a device strength or a desired dielectric constant (the size of the capacitance can be adjusted by the dielectric constant). This material is mixed with an organic material as needed, is manufactured in any shape, and is sintered by a heating process as needed, thereby forming a substrate.

Since the dielectric substrates 2 are a reference of the laminated body of the multilayer capacitor 1, the dielectric substrates 2 have the same size or shape as that of the multilayer capacitor 1. For example, as shown in FIGS. 2(a) and 2(b), the dielectric substrates 2 have the rectangular flat-plate shape in a direction which extends toward the external electrodes 4. The dielectric substrates may have the other shape if the dielectric substrates have the flat plate shape. In order to improve durability, corners may be chamfered. Particularly, when the corners of the dielectric substrates 2 which are laminated in the edge are chamfered, it is possible to prevent the dielectric substrates from be damaged or injured upon manufacturing, delivering and mounting and to improve impact resistance.

The dielectric substrates 2 having different thicknesses D may be previously formed and the dielectric substrates 2 having the different thicknesses D may be laminated upon laminating. For example, the dielectric substrate 2 having the small thickness D may be laminated at a position close to the edge of the lamination direction of the multilayer capacitor 1 and the dielectric substrate 2 having the large thickness D may be laminated in the central portion of the lamination direction. In this case, since the thickness of the dielectric substrate 2 in the central portion 7 in which the strong voltage stress is caused is relatively large, the durability against the voltage stress caused in the facing internal electrodes 3 and 5 is improved and the voltage stress is in balance over the whole multilayer capacitor 1.

The internal electrodes 3 and 5 are thin-film shaped electrodes formed on the dielectric substrates 2 and are formed on the surfaces of the plate-shaped dielectric substrates 2 which are a lamination unit. The material of the internal electrodes 3 and 5 may be a metal material including at least one of Ni, Ag, Pd, Cu and Au or an alloy thereof. Particularly, Ni or Ni alloy is advantageous in view of cost. The alloy of the above-described materials may be used or the surfaces of the above-described materials may be subjected to a plating process. The thicknesses of the internal electrodes 3 and 5 may be preferably 1 to 5 μm. When the thicknesses of the internal electrodes 3 and 5 are less than 1 μm, the electrodes are prone to be cut and the capacitance decreases. Accordingly, the capacitance balance of the same layer deteriorates and the breakdown voltage decreases. In contrast, when the thickness of the internal electrodes 3 and 5 is greater than 5 μm, the adhesion between the dielectric substrates 2 upon laminating is insufficient, a gap therebetween excessively increases and a lamination strength is insufficient.

The internal electrodes 3 and 5 may be formed by transferring and printing the electrodes formed on a transfer body and made of the metal material onto the surface of the dielectric substrates 2. In the case of the transferring printing, the dielectric substrate 2 is not damaged due to the solvent in the paste and the breakdown voltage can be prevented from deteriorating. The internal electrodes 3 and 5 may be formed by directly coating the surface of the dielectric substrate 2 with a metal paste. The internal electrodes 3 and 5 may be formed using deposition or plating. The internal electrode 3 may be formed on the surface of the dielectric substrate 2 by a screen printing method. At this time, attention needs to be paid to the damage of the dielectric substrates. The method of forming the internal electrodes may be determined by the shape, the area and the thickness precision of the internal electrodes 3 and 5, the durability and the affinity between the material of the dielectric substrates 2 and the internal electrodes 3 and 5.

As shown in FIGS. 1(*a*), 1(*b*), 2(*a*) and 2(*b*), it is preferable that the internal electrodes 3 and 5 are formed in plural on the surface of the dielectric substrate 2 so as to form a series-parallel circuit in the multilayer capacitor 1. Accordingly, since the voltage is divided, the breakdown voltage is improved. The internal electrodes 3 and 5 formed on the plurality of dielectric substrates 2 in one layer may be connected to the external electrodes 4 and the plurality of internal electrodes 3 formed on the surface of the dielectric substrate 2 in a next layer which overlaps the one layer are not connected to the external electrodes 4. Since the internal electrodes 3 formed on the dielectric substrates laminated on the layers, which overlap in the lamination direction, face each other and one side of the facing internal electrodes 3 is connected to the external electrodes, when a voltage is applied to the external electrodes 4, the voltage difference between the facing internal electrodes 3 is generated and, as a result, a capacitance component is generated in a facing region. At this time, since the plurality of layers is laminated and the plurality of internal electrodes 3 is formed on one dielectric substrate 2, a place where a plurality of capacitance components is caused is generated and, as a result, large capacitance is generated in the whole multilayer capacitor 1.

When the internal electrodes 3 having a division structure are formed on the surface of one dielectric substrate 2, the dielectric substrate having a large distance W (see FIG. 1(*a*)) between the adjacent internal electrodes is further improved than the dielectric substrate having a small distance in view of the breakdown voltage. However, since the area of the electrode is small, the capacitance value is reduced. When the divided internal electrodes 3 are formed on the surface of the dielectric substrate 2 and the division number is large, the breakdown voltage is improved and the capacitance value is reduced. By using the above-described principle with respect to the electrical deformation which is concentrated in the central portion of the longitudinal direction, the height direction and the horizontal direction of the multilayer capacitor 1, the durability of the multilayer capacitor 1 can be improved.

As discussed above, in order to enhance the breakdown voltage of the multilayer capacitor 1, it is preferable to become in large the distance W between the adjacent internal electrodes near the central portion of the dielectric substrate 2. Further, in view of the balance between the capacitance value and the breakdown voltage, it is preferable to arrange the distance, which is defined between the adjacent electrodes provided on the main surface of the dielectric substrate 2, in large from the edge side of the main surface to the central side thereof. Here, the central side defines one point having a shorter distance between one point and the center when any two points are arranged on the main surface of the dielectric substrate 2.

The external electrode 4 is provided to apply a voltage to the multilayer capacitor 1 and is formed on the external surface of the laminated body 20. The material of the external electrode 4 may be a metal material including at least one of Ni, Ag, Pd, Cu and Au or an alloy thereof, similar to the internal electrode 3. Particularly, Ni or Ni alloy is advantageous in view of cost. The alloy of the above-described materials may be used or the surfaces of the above-described materials may be subjected to a plating process. Alternatively, an alloy may be used. The external electrode may be formed by deposition, paste, printing or plating. The external electrodes may be previously laminated in the edges of the dielectric substrates 2 and the dielectric substrates may be then laminated. Alternatively, the dielectric substrates 2 may be laminated and the external electrodes 4 may be then formed in the edges of the dielectric substrates.

The distance W is a distance between the adjacent internal electrodes as described in the description of the internal electrodes 3 and 5 and the durability against the voltage, that is, the breakdown voltage, varies depending on the size of the distance W.

The central portion 7 is the periphery of the central portion of the lamination direction of the dielectric substrate 2 of the multilayer capacitor 1 and strongest voltage stress is caused therein. Accordingly, when the breakdown voltage required in the portion other than the central portion 7 and the breakdown voltage required in the periphery of the central portion 7 are different. Thus, when the breakdown voltage is in balance, the breakdown voltage of the whole capacitor 1 can be improved.

Figure 3:
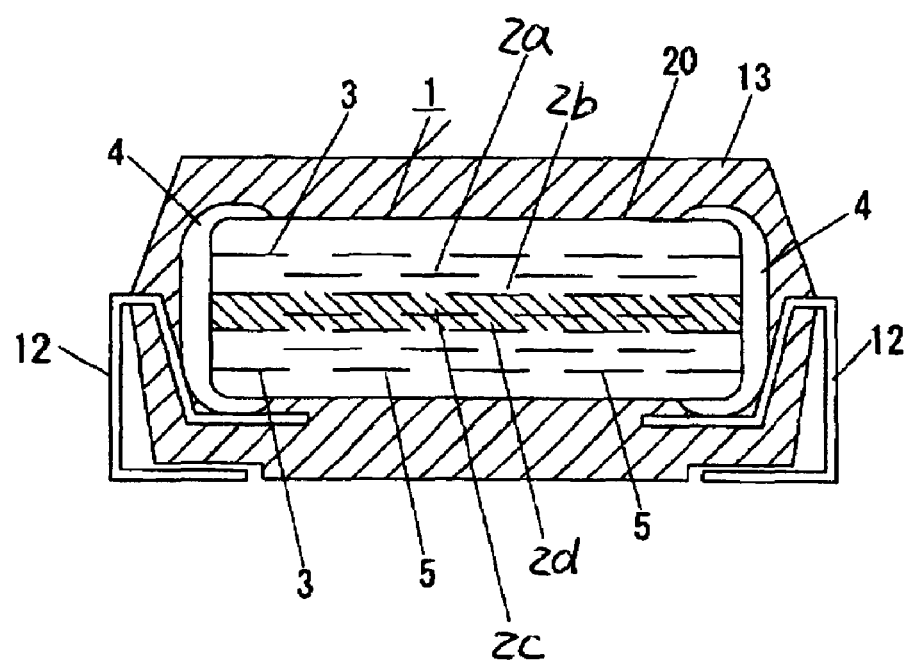
FIG. 3 is a cross-sectional view of a mold capacitor including the multilayer capacitor according to the present embodiment.

FIG. 3 is a cross-sectional view of a mold capacitor including the multilayer capacitor 1 according to the present embodiment. The mole capacitor 11 is obtained by sealing the multilayer capacitor 1 by a covering material 13, and the breakdown voltage, impact resistance and moisture resistance can be improved by a structure for protecting the multilayer capacitor 1 from an external field. By protruding lead terminals 12 from the covering material 13, a distance between the lead terminals 12 increases and thus the breakdown voltage is improved. Since the multilayer capacitor 1 is not exposed by the covering material 13, the multilayer capacitor is prevented from being injured or damaged.

The lead terminals 12 may be protruded from the side surface or the bottom surface of the covering material 13. Since the lead terminals 12 are protruded from the side surface or the bottom surface, a space (allowance) is generated between the covering material 13 and the lead terminals 12 and strain resistance upon mounting can be improved.

The covering material 13 is a member for sealing the whole multilayer capacitor and a portion of the lead terminals 12 and is preferably made of epoxy resin such as cresol novolac, biphenyl or pentadiene. The other material may be mixed or a cheaper resin may be used. When a minimum value (a portion of the covering material 12 having a smallest thickness) of the interval between the surface of the covering material 13 and the surface of the multilayer capacitor 2 is at least 0.1 mm, the breakdown voltage of the envelope can be improved. Accordingly, an electronic parts having excellent breakdown voltage, moisture resistance and heat resistance can be obtained.

The covering material 13 may generally have a substantially rectangular parallelepiped or a substantially cube. Chamfers, arcs or concave portions may be provided in the corners of the covering material 13 and any side surface of the covering material has a trapezoidal column or an elliptical column. Alternatively, the characteristic portions of the above-described shapes may be combined. The impact resistance of the covering material 13 is improved by these shapes.

Figure 4A:
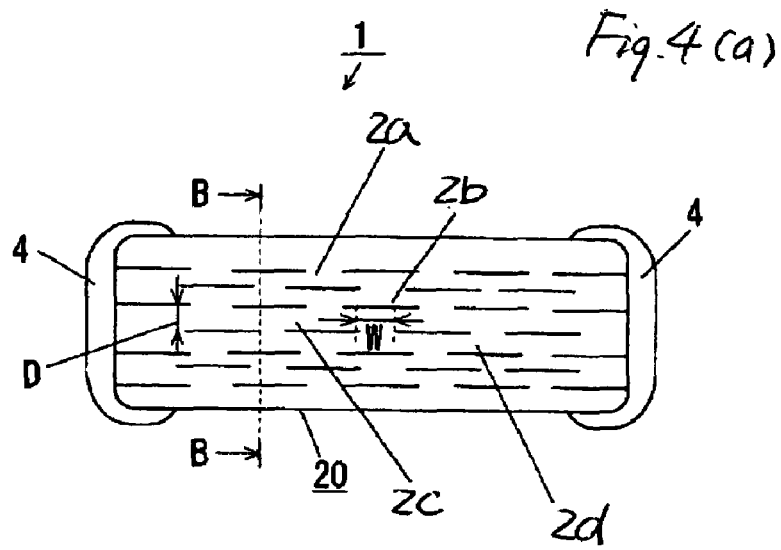
FIG. 4(a) is a side cross-sectional view of a multilayer capacitor according to another embodiment.
Figure 4B:
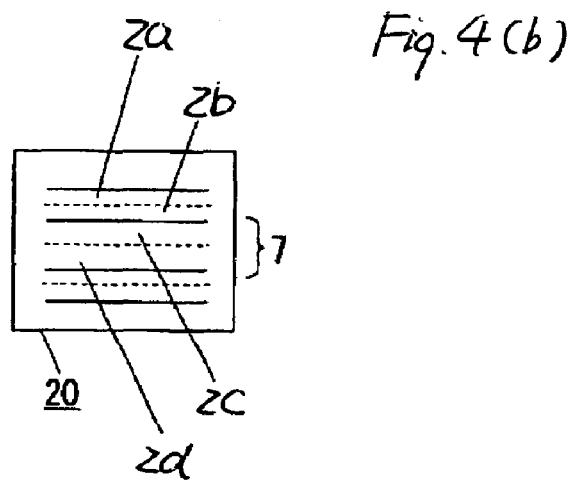
FIG. 4(b) is a cross-sectional view taken along line B-B of the multilayer capacitor shown in FIG. 4(a)
Figure 5A:
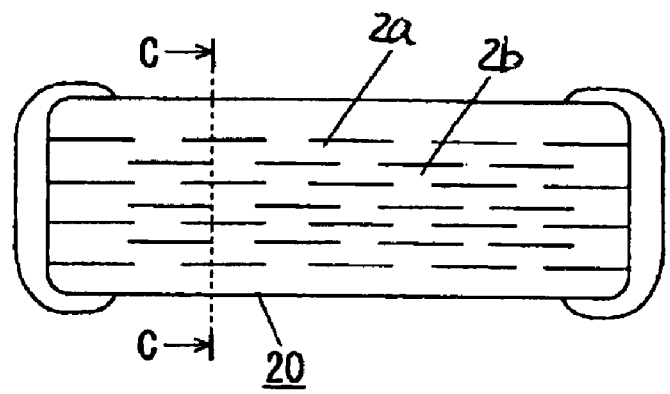
FIG. 5(a) is a side cross-sectional view of a multilayer capacitor according to another embodiment.
Figure 5B:
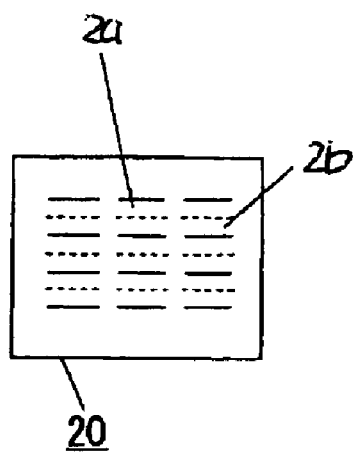
FIG. 5(b) is a cross-sectional view taken along line C-C of the multilayer capacitor shown in FIG. 5(a)
Figure 6A:
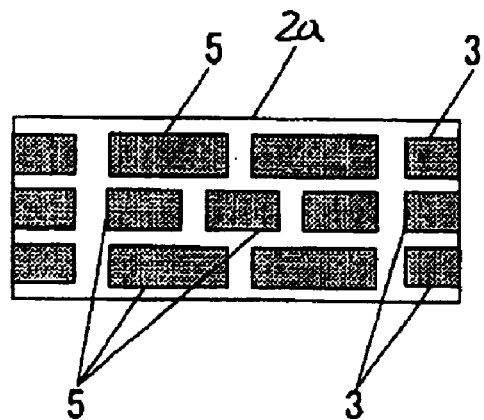
FIG. 6(a) is a view showing the shape of internal electrodes formed on a dielectric substrate 2a of the multilayer capacitor shown in FIG. 5(a)
Figure 6B:
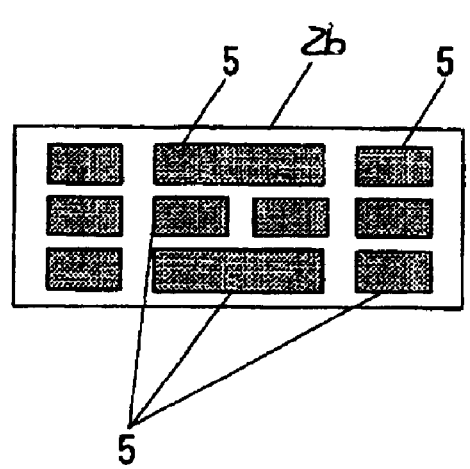
FIG. 6(b) is a view showing the shape of internal electrodes formed on a dielectric substrate 2b of the multilayer capacitor shown in FIG. 5(a)

FIG. 4(a) is a side cross-sectional view of a multilayer capacitor according to another embodiment. FIG. 4(b) is a cross-sectional view taken along line B-B of the multilayer capacitor shown in FIG. 4(a). In the present embodiment, the dielectric substrate 2 having the large distance W is disposed in the periphery of the central portion 7 and the dielectric substrate 2 having the large thickness D is disposed in the periphery of the central portion 7. By this configuration, the breakdown voltage can be improved and the multilayer capacitor in which the voltage stress is properly in balance can be obtained. The configuration of the distance W and the substrate thickness D and the configuration of the dielectric constant may be combined and the breakdown voltage can be further improved by the synergistic effect of the combination.

The distance W may gradually increase from the edge of the main surface of the dielectric substrate to the periphery of the central portion.

As shown in FIGS. 5(a), 5(b), 6(a) and 6(b), when the internal electrode (extraction electrode) 3 and the internal electrode 5 are divided into at least two (three in this example) on the substrates including the dielectric substrates 2a (or 2c) and 2b (or 2d) in the horizontal direction perpendicular to the lamination direction, plural rows (three rows) of electrodes which extend in the longitudinal direction are formed, and the division number of the internal electrodes of the central portion 7 in the horizontal direction perpendicular to the lamination direction is larger than that of the internal electrodes of the other portion to increase the number of the internal electrodes, the voltage stress is in balance and thus the breakdown voltage can be improved. It is preferable that the division number of the internal electrodes in the periphery of the central portion 7 of the lamination direction is larger than that of the other portion and at the same time the division number of the internal electrodes in the periphery of the central portion in the direction perpendicular to the lamination direction increases.

The division number of the internal electrodes of the dielectric substrate may gradually increase from the edge of the main surface of the dielectric substrate to the periphery of the central portion.

When the numbers of the internal electrodes 3 and 5 vary depending on the voltage stress and the thickness of the dielectric substrate varies (the numbers of the internal electrodes 3 and 5 increases in the periphery of the central portion 7 in which the strong voltage stress is caused to increase the thickness D of the substrate), the whole breakdown voltage can be optimized and the breakdown voltage can be improved to a maximum in the same shape or the same size. The configuration of the horizontal division and the configuration of the dielectric constant may be combined, and, in this case, the breakdown voltage can be further improved by the synergistic effect of the combination.

By decreasing the dielectric constant of the dielectric substrate, it is possible to reduce the voltage across the external electrodes. As the dielectric constant decreases, the breakdown voltage is improved. With respect to the strong voltage stress in the periphery of the central portion in the height direction of the multilayer capacitor which was conventionally problematic, the breakdown voltage is improved by decreasing the dielectric constant of the dielectric substrate located at the central portion. When the internal electrodes are divided into plural rows in the horizontal direction and the division number of the internal electrodes in the central portion, which are divided in the horizontal direction is larger than that of the internal electrodes in the portion other than the central portion, the breakdown voltages of the multilayer capacitor are averaged when the voltage is applied to the multilayer capacitor. As a result, the multilayer capacitor having a strongest breakdown voltage can be obtained in the device having the same size.

The voltage stress gradually increases toward the periphery of the central portion in the lamination direction of the multilayer capacitor and the voltage stress gradually increases toward the periphery of the central portion in the horizontal direction of the multilayer capacitor. However, in the present embodiment, by decreasing the dielectric constant of the dielectric substrate in the periphery of the central portion to suppress the intensity of the electric flux line of the central portion, a structure suitable for the breakdown voltage and the distribution of the voltage stress of the internal electrodes which overlap in the lamination direction can be in balance. By dividing the internal electrodes into at least two in the horizontal direction such that the division number of the internal electrodes in the periphery of the central portion is larger than that of the internal electrodes the portion other than the central portion, the central portion of the horizontal direction is reinforced and thus a multilayer capacitor having a highest breakdown voltage can be obtained in the device having the same size.

By connecting the lead terminals to the multilayer capacitor and covering a portion of the lead terminals and the multilayer capacitor with the covering material, the breakdown voltage can further increase and the durability such as impact resistance can be improved. As a result, a multilayer capacitor having a high breakdown voltage without impeding the high capacitance and the miniaturization can be efficiently obtained and can be preferably used in an electronic apparatus requiring a high breakdown voltage.

As described above, a multilayer capacitor and a mold capacitor according to the present invention can be suitably used in an electronic apparatus such as a modem, a power supply circuit, a liquid crystal power supply, a DC-DC converter, a power line communication apparatus and, more particularly, in removing noise or cutting a DC component in such a electronic apparatus.

The entire disclosure of the Japanese Patent Application 2005-264966 filed on Sep. 13, 2005 including specification, claims, drawings and abstract is incorporated herein by reference in its entirely.

What is claimed is:

1. A capacitor comprising:
a first dielectric interposed by a first pair of electrodes and having a first dielectric constant;
a second dielectric interposed by a second pair of electrodes and having a second dielectric constant; and
a third dielectric disposed between the first dielectric and the second dielectric, and interposed by a third pair of electrodes, and having the third dielectric constant lower than the first and second dielectric constants.

2. The capacitor according to claim 1, wherein the first dielectric constant is equal to the second dielectric constant.

3. The capacitor according to claim 2, wherein a plurality of electrodes is provided on the first, second and third dielectrics.

4. The capacitor according to claim 3, wherein the first, second and third dielectrics have a main surface on which a plurality of electrodes are provided, respectively, the electrodes are arranged with the predetermined interval on the main surfaces of the first, second and third dielectrics, respectively, and the predetermined interval sets in large from an edge portion of the main surface to a central portion of the main surface.

5. The capacitor according to claim 3, wherein the first, second and third dielectrics have a main surface on which a plurality of electrodes are provided, respectively, and the number of the plurality of electrodes becomes in large from an edge of main surface to a central portion of the main surface.

6. The capacitor according to claim 3, wherein the electrodes are formed by a transferring process.

7. The capacitor according to claim 3, wherein the electrodes are formed by a screen printing.

8. The capacitor according to claim 3, wherein the electrodes are formed by a paste coating.

9. The capacitor according to claim 3, further comprising:
a pair of lead terminals connected to the capacitor; and
an covering material covering a portion of the pair of lead terminals and the capacitor.

10. The capacitor according to claim 1, wherein the first dielectric constant is different from the second dielectric constant.

11. The capacitor according to claim 1, wherein the first, second and third dielectrics have a plate shape and provide an electrode thereon, and
wherein the first, second and third dielectrics are laminated.

12. The capacitor according to claim 11, wherein the third dielectric is larger in the thickness than those of the first and second dielectrics.

* * * * *